(12) United States Patent
Kin et al.

(10) Patent No.: US 10,896,545 B1
(45) Date of Patent: Jan. 19, 2021

(54) NEAR EYE DISPLAY INTERFACE FOR ARTIFICIAL REALITY APPLICATIONS

(71) Applicant: Facebook Technologies, LLC, Menlo Park, CA (US)

(72) Inventors: Kenrick Cheng-kuo Kin, Vancouver, WA (US); Albert Peter Hwang, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 116 days.

(21) Appl. No.: 15/825,128

(22) Filed: Nov. 29, 2017

(51) Int. Cl.
*G06K 9/00* (2006.01)
*G06T 19/00* (2011.01)
*G02B 27/01* (2006.01)
*G02B 5/30* (2006.01)
*G06F 3/01* (2006.01)
*G06F 3/03* (2006.01)

(52) U.S. Cl.
CPC .............. *G06T 19/006* (2013.01); *G02B 5/30* (2013.01); *G02B 27/0172* (2013.01); *G02B 27/0176* (2013.01); *G06F 3/012* (2013.01); *G06F 3/013* (2013.01); *G06F 3/017* (2013.01); *G06F 3/0304* (2013.01)

(58) Field of Classification Search
CPC ..... G06T 19/006; G06F 3/012; G06F 3/0304; G06F 3/017; G06F 3/013; G02B 5/30; G02B 27/0176; G02B 27/0172
See application file for complete search history.

(56) References Cited

U.S. PATENT DOCUMENTS

| | | | | |
|---|---|---|---|---|
| 2011/0013810 | A1* | 1/2011 | Engstrom | G06K 9/00288 382/118 |
| 2014/0147829 | A1* | 5/2014 | Jerauld | G06F 1/163 434/430 |
| 2014/0364967 | A1* | 12/2014 | Sullivan | G06F 1/163 700/83 |
| 2015/0002676 | A1* | 1/2015 | Yoo | G02B 27/017 348/159 |
| 2015/0312561 | A1* | 10/2015 | Hoof | G02B 27/0172 348/46 |
| 2017/0236332 | A1* | 8/2017 | Kipman | G02B 27/0172 345/633 |

(Continued)

*Primary Examiner* — Tom Y Lu
(74) *Attorney, Agent, or Firm* — Fenwick & West LLP

(57) ABSTRACT

A system includes a near eye display (NED) comprising a substantially transparent electronic display that is configured to display images in accordance with display instructions, and an imaging device configured to capture one or more images of a portions of a local area surrounding the NED. The system further includes a controller configured to determine a position of an object within the local area using the captured one or more images and location information associated with the object. The controller accesses supplemental information regarding the object, and updates the display instructions to cause the substantially transparent electronic display to display at least a portion of the supplemental information about the object. The display of the at least a portion of the supplemental information is positioned within a threshold distance of the determined position of the object in an augmented reality environment as presented via the substantially transparent electronic display.

26 Claims, 9 Drawing Sheets

(56) References Cited

U.S. PATENT DOCUMENTS

| | | | | |
|---|---|---|---|---|
| 2018/0060946 A1* | 3/2018 | Devries | ............. | G06Q 30/0643 |
| 2018/0336008 A1* | 11/2018 | Nakagawa | ............ | G06F 3/0481 |
| 2018/0342103 A1* | 11/2018 | Schwarz | ............... | G06T 19/006 |
| 2019/0088026 A1* | 3/2019 | Isaacson | ............... | G06T 19/006 |

* cited by examiner

700

```
┌─────────────────────────────────────┐
│ Determine a position of an object within the │
│ local area using the captured one or more │
│ images and location information associated │
│           with the object           │
│                710                  │
└─────────────────────────────────────┘
                  ↓
┌─────────────────────────────────────┐
│ Access supplemental information regarding │
│             the object              │
│                720                  │
└─────────────────────────────────────┘
                  ↓
┌─────────────────────────────────────┐
│ Update the display instructions to cause the │
│ substantially transparent electronic display to │
│ display at least a portion of the supplemental │
│       information about the object       │
│                730                  │
└─────────────────────────────────────┘
```

FIG. 7

NEAR EYE DISPLAY INTERFACE FOR ARTIFICIAL REALITY APPLICATIONS

BACKGROUND

The present disclosure generally relates to a gesture and eye tracking system, and specifically a near-eye display (NED) interface for artificial reality applications.

Augmented reality systems typically rely on wearable devices that have smaller form factors than classical virtual reality (VR) head mounted devices. The use of augmented reality systems presents new challenges in user interaction. Previous methods of user interaction with the local area may not be sufficient or optimal in an augmented reality system. For example, without the use of augmented reality, a user may need to interact physically with a device in a local area in order to enable a change in that device. However, with the user of augmented reality, both the device and the user experience may be upgraded to allow the user to cause a change in the device using methods other than simply physical interaction. However, such changes in user experience should be intuitive for the user to understand and should be technically feasible. Current method of user interaction in augmented reality are not readily intuitive and do not exploit the technical capabilities of an augmented reality system, and thus are not optimal for use.

SUMMARY

A system includes a near eye display (NED) and a controller. The NED includes an optical assembly that is substantially transparent and has an electronic display that is configured to display images in accordance with display instructions. The NED also includes an imaging device. The imaging device is configured to capture one or more images of a portions of a local area surrounding the NED. The system further includes a controller configured to determine a position of an object within the local area using the captured one or more images and location information associated with the object. The controller accesses supplemental information (e.g., user profile information accessed from an online system) regarding the object (e.g., the user), and updates the display instructions to cause the substantially transparent electronic display to display at least a portion of the supplemental information about the object. The display of the at least a portion of the supplemental information is positioned within a threshold distance of the determined position of the object in an augmented reality environment as presented via the substantially transparent electronic display. For example, the controller may transmit instructions to the electronic display to present the supplemental information of a person (i.e., the object) near that person, as viewed by the user of the near eye display.

BRIEF DESCRIPTION OF THE DRAWINGS

FIG. 7 is a flowchart illustrating a process for providing a NED filter in an eyewear device, according to an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

An eyewear device can incorporate an eye tracking system that includes light sources and a camera. The eyewear device also includes an optical element, which may include an electronic display or display path element (such as a waveguide display), a lens or lens stack (such as a powered optical element, corrective lens, or a UV lens), or a combination of displays and/or lenses.

The eye tracking system may be used, in conjunction with a system to track one or more objects in the local area, in order to display additional information about the objects, such as other users, to the user via the eyewear device (e.g., via the optical element of the eyewear device). This information may include information received from an online system regarding other users in the local area. The system may additionally include a hand pose and gesture tracking system to allow the user of the eyewear device to select from a virtual or simulated contextual menu in order to update the information for the user, so that other users with similar eyewear devices may see the updated information about the user.

NED System Overview

Figure 1:
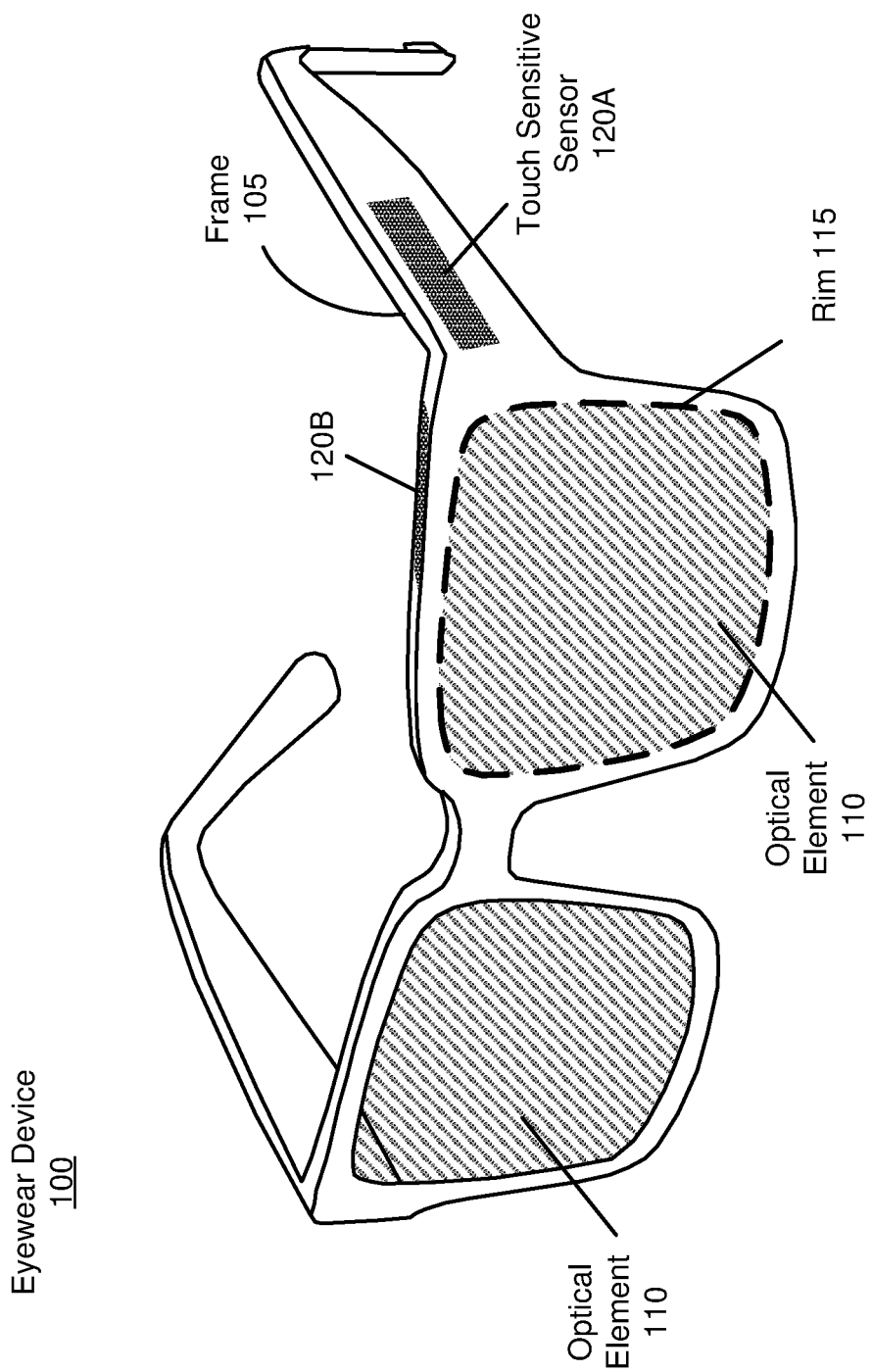
FIG. 1 is a diagram of an eyewear device, in accordance with an embodiment.

FIG. 1 is a diagram of an eyewear device 100, in accordance with an embodiment. In some embodiments, the eyewear device 100 is a near-eye-display (NED) for presenting media to a user. Examples of media presented by the eyewear device 100 include one or more images, text, video, audio, or some combination thereof. In some embodiments, audio is presented via an external device (e.g., speakers and/or headphones) that receives audio information from the eyewear device 100, a console (not shown), or both, and presents audio data based on the audio information. The eyewear device 100 can be configured to operate as a virtual reality (VR) NED, an augmented reality (AR) NED, a mixed reality (MR) NED, or some combination thereof. For example, in some embodiments, the eyewear device 100 may augment views of a physical, real-world environment with computer-generated elements (e.g., images, video, sound, etc.).

In other embodiments, the eyewear device 100 does not present media or information to a user. For example, the eyewear device 100 may be used in conjunction with a separate display. In other embodiments, the eyewear device 100 may be used for various research purposes, training applications, biometrics applications (e.g., fatigue or stress detection), automotive applications, communications systems for the disabled, or any other application in which eye tracking can be used.

The eyewear device 100 shown in FIG. 1 includes a frame 105 and an optical element 110 (or optical assembly), which is surrounded by a rim 115. The optical element 110 is substantially transparent (e.g., allows a percentage transmittance) in the visible spectrum and may also include a substantially transparent electronic display. The frame 105 is coupled to one or more optical elements. In some embodiments, the frame 105 may represent a frame of eyewear glasses. The optical element 110 may be configured for users to see content presented by the eyewear device 100. For example, the eyewear device 110 can include at least one waveguide display assembly (not shown) for directing one or more image light to an eye of the user. A waveguide display assembly includes, e.g., a waveguide display, a stacked waveguide display, a stacked waveguide and powered optical elements, a varifocal waveguide display, or some combination thereof. For example, the waveguide display may be monochromatic and include a single waveguide. In some embodiments, the waveguide display may be polychromatic and include a single waveguide. In yet other embodiments, the waveguide display is polychromatic and includes a stacked array of monochromatic waveguides that are each associated with a different band of light, i.e., are each sources are of different colors. A varifocal waveguide display is a display that can adjust a focal position of image light emitted from the waveguide display. In some embodiments, a waveguide display assembly may include a combination of one or more monochromatic waveguide displays (i.e., a monochromatic waveguide display or a stacked, polychromatic waveguide display) and a varifocal waveguide display. Waveguide displays are described in detail in U.S. patent application Ser. No. 15/495,373, incorporated herein by references in its entirety.

In some embodiments, the optical element 110 may include one or more lenses or other layers, such as lenses for filtering ultraviolet light (i.e., sunglass lenses), polarizing lenses, corrective or prescription lenses, safety lenses, 3D lenses, tinted lenses (e.g., yellow tinted glasses), reciprocal focal-plane lenses, or clear lenses that do not alter a user's view. The optical element 110 may include one or more additional layers or coatings, such as protective coatings, or coatings for providing any of the aforementioned lens functions. In some embodiments, the optical element 110 may include a combination of one or more waveguide display assemblies, one or more lenses, and/or one or more other layers or coatings.

The rim 115 is an outer portion of the optical element 110 that is in contact with the frame 105. The rim 115 forms the edge of the optical element and can be surrounded by or housed in the frame 105.

In one embodiment, one or more touch sensitive sensors 120 are attached to the rim 115 or frame 105. In the illustrated example, the frame 105 includes two touch sensitive sensors 120A and 120B. Each touch sensitive sensor 120A or 120B may use capacitive, resistive, or other technology to detect contact with a user's skin (e.g., a user's finger). Upon contact, the touch sensitive sensor 120A or 120B may transmit a signal to a controller of the eyewear device 100 that indicates a location on the touch sensitive sensor at which contact was made, a duration of contact, an area of contact, and/or any movement of the contact location. Such a touch sensitive sensor 120A/B can allow the eyewear device 100 to accept additional input from the user at a location that is conveniently accessible to the user. Although the touch sensitive sensors 120A and 120B are illustrated in FIG. 1 at a particular location on the frame 105 and with a particular orientation and shape, in other embodiments the frame 105 may include a greater or fewer number of touch sensitive sensors at different locations with different shapes and/or orientations. For example, the touch sensitive sensor 120A may be on the opposite temple of the frame 105 rather than on the temple that is shown.

Figure 2:
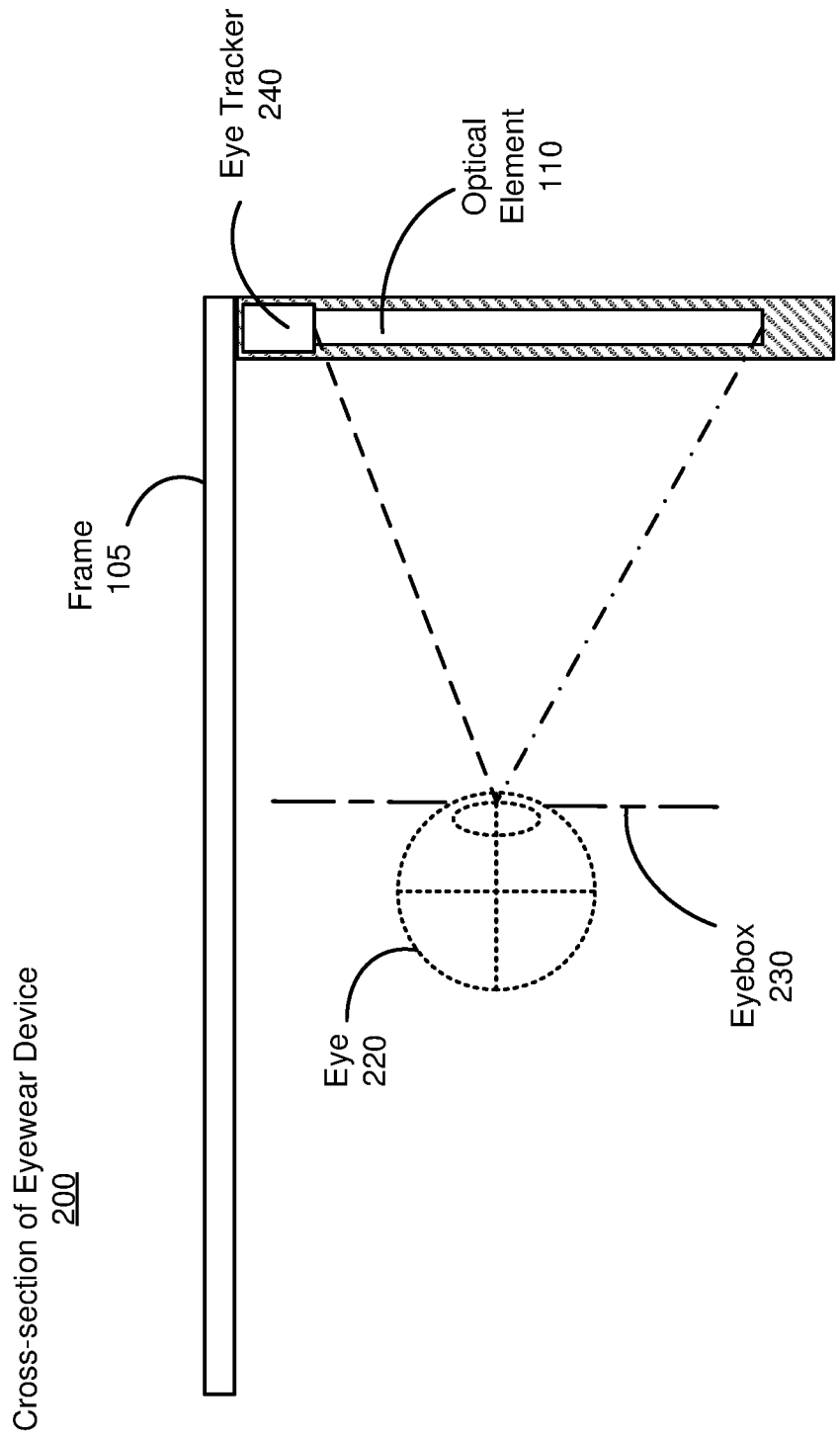
FIG. 2 is a cross section of the eyewear device of FIG. 1, in accordance with an embodiment.

FIG. 2 is a cross-section 200 of the eyewear device 100 illustrated in FIG. 1, in accordance with an embodiment. The optical element 110 is housed in the frame 105, which is shaded in the section surrounding the optical element 110. A user's eye 220 is shown, with dotted lines leading out of the pupil of the eye 220 and extending outward to show the eye's field of vision. An eyebox 230 shows a location where the eye 220 is positioned if the user wears the eyewear device 100. The eyewear device 100 includes an eye tracking system.

The eye tracking system determines eye tracking information for the user's eye 220. The determined eye tracking information may include information about a position of the user's eye 220 in an eyebox 230, e.g., information about an angle of an eye-gaze. An eyebox represents a three-dimensional volume at an output of a display in which the user's eye is located to receive image light.

In one embodiment, the eye tracking system includes one or more light sources to illuminate the eye at a particular wavelength or within a particular band of wavelengths (e.g., infrared). The light sources may be placed on the frame 105 such that the illumination from the light sources are directed to the user's eye (e.g., the location of the eyebox 230). The light sources may be any device capable of producing visible or infrared light, such as a light emitting diode. The illumination of the user's eye by the light sources may assist the eye tracker 240 in capturing images of the user's eye with more detail. The eye tracker 240 receives light that is emitted from the light sources and reflected off of the eye 220. The eye tracker 240 captures images of the user's eye, and the eye tracker 240 or an external controller can analyze the captured images to measure a point of gaze of the user (i.e., an eye position), motion of the eye 220 of the user (i.e., eye movement), or both. The eye tracker 240 may be a camera or other imaging device (e.g., a digital camera) located on the frame 105 at a position that is capable of capturing an unobstructed image of the user's eye 220 (or eyes).

The one embodiment, the eye tracking system determines depth information for the eye 220 based in part on locations of reflections of the light sources. Additional discussion regarding how the eye tracker 240 determines depth information is found in, e.g., U.S. application Ser. No. 15/456,383 and U.S. application Ser. No. 15/335,634, both of which are hereby incorporated by reference. In another embodiment, the eye tracker 240 does not include light sources, but instead captures images of the user's eye 220 without additional illumination.

The eye tracker 240 can be embedded in an upper portion of the frame 105, but may be located at any portion of the frame at which it can capture images of the user's eye. While only one eye tracker 240 is shown in FIG. 2, the eyewear device 100 may include multiple eye trackers 240 per eye 220.

Figure 3:
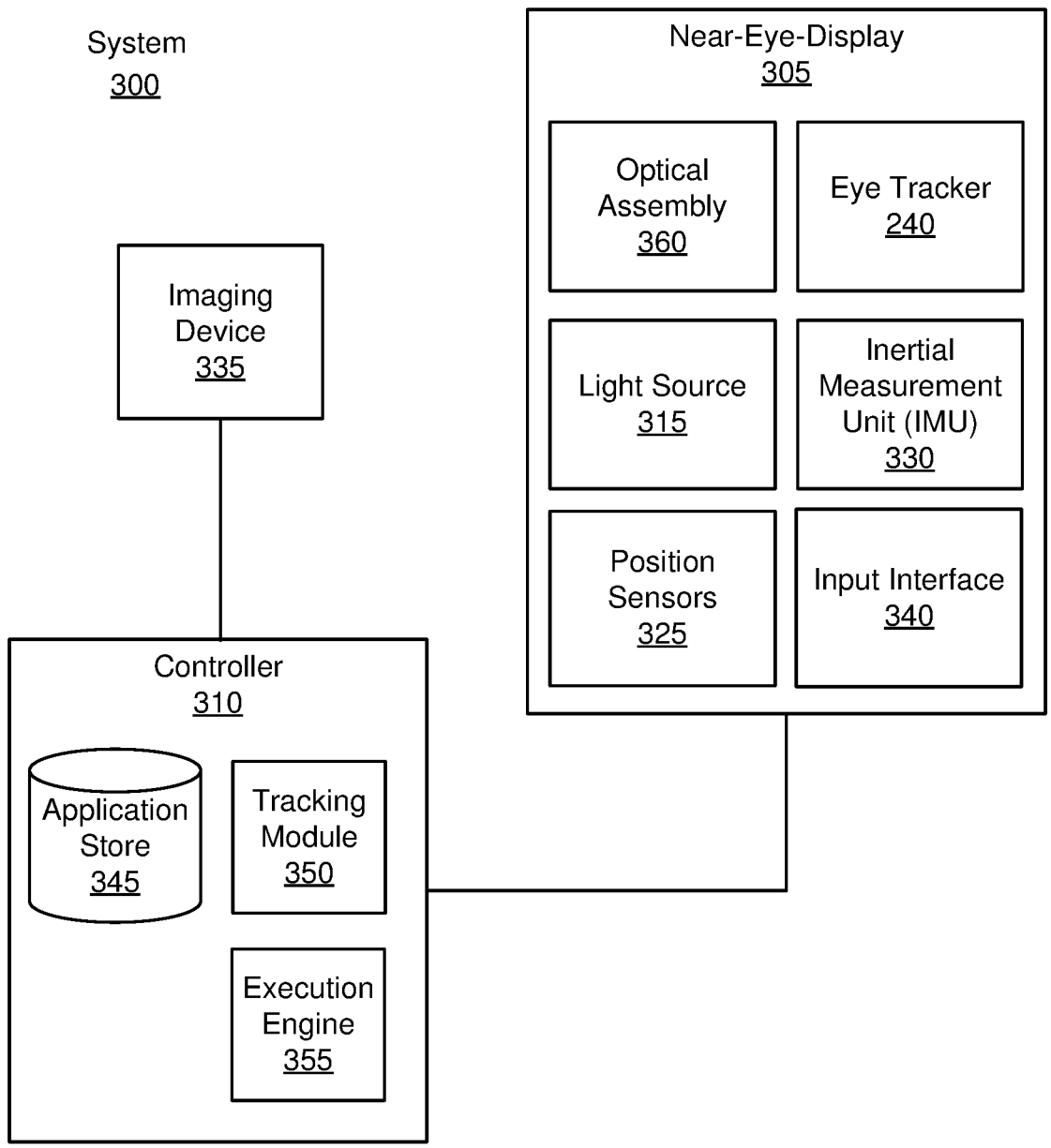
FIG. 3 is a block diagram of a NED system with an eye tracker, in accordance with an embodiment.

FIG. 3 is a block diagram of a NED system 300 with an eye tracker, in accordance with an embodiment. The NED system 300 shown by FIG. 3 comprises a NED 305, an imaging device 335, and an input interface 340 that are each coupled to the controller 310. While FIG. 3 shows an example NED system 300 including one NED 305, one imaging device 335, and one input interface 340, in other embodiments any number of these components may be included in the NED system 300. For example, there may be multiple NEDs 305 each having an associated input interface 340 and being monitored by one or more imaging devices 335, with each NED 305, input interface 340, and imaging devices 335 communicating with the controller 310. In alternative configurations, different and/or additional components may be included in the NED system 300. Similarly, functionality of one or more of the components can be distributed among the components in a different manner than is described here. For example, some or all of the functionality of the controller 310 may be contained within the NED 305. The NED system 300 may operate in an artificial reality environment.

The NED 305 presents content to a user. In some embodiments, the NED 305 is the eyewear device 100. Examples of content presented by the NED 305 include one or more images, video, audio, text, or some combination thereof. In some embodiments, audio is presented via an external device (e.g., speakers and/or headphones) that receives audio information from the NED 305, the controller 310, or both, and presents audio data based on the audio information. In some embodiments, the NED 305 operates as an artificial reality NED. In some embodiments, the NED 305 may augment views of a physical, real-world environment with computer-generated elements (e.g., images, video, sound, etc.).

The NED 305 includes an optical assembly 360 for each eye, an eye tracker 240, one or more light sources 315, one or more locators 320, one or more position sensors 325, and an inertial measurement unit (IMU) 330. Some embodiments of the NED 305 have different components than those described here. Similarly, the functions can be distributed among other components in the NED system 300 in a different manner than is described here. In some embodiments, the optical assembly 360 displays images to the user in accordance with data received from the controller 310. In one embodiment, the optical assembly 360 is substantially transparent (e.g., by a degree of transmittance) to electromagnetic radiation in the visible spectrum.

The eye tracker 240 tracks a user's eye movement. The eye tracker 240 includes a camera for capturing images of the user's eye. Examples of the eye tracker 240 and the components of the eye tracker 240 are described with respect to FIG. 2. Based on the detected eye movement, the eye tracking unit may communicate with the controller 310 for further processing.

In some embodiments, the eye tracker 240 allows a user to interact with content presented to the user by the controller 310 based on the detected eye movement. Example interactions by the user with presented content include: selecting a portion of content presented by the controller 310 (e.g., selecting an object presented to the user), movement of a cursor or a pointer presented by the controller 310, navigating through content presented by the controller 310, presenting content to the user based on a gaze location of the user, or any other suitable interaction with content presented to the user.

In some embodiments, NED 305, alone or conjunction with the controller 310 or another device, can be configured to utilize the eye tracking information obtained from the eye tracker 240 for a variety of display and interaction applications. The various applications include, but are not limited to, providing user interfaces (e.g., gaze-based selection), attention estimation (e.g., for user safety), gaze-contingent display modes, metric scaling for depth and parallax correction, etc. In some embodiments, based on information about position and orientation of the user's eye received from the eye tracking unit, a controller (e.g., the controller 310) determines resolution of the content provided to the NED 305 for presentation to the user on the optical assembly 360. The optical assembly 360 may provide the content in a foveal region of the user's gaze (and may provide it at a higher quality or resolution at this region).

In another embodiment, the eye tracking information obtained from the eye tracker 240 may be used to determine the location of the user's gaze in the local area. This may be used in conjunction with a gesture detection system to allow the system to detect various combinations of user gesture and gazes. As described in further detail below, different combinations of user gaze and gestures, upon detection by the controller 310, may cause the controller 310 to transmit further instructions to devices or other objects in the local area, or execute additional instructions in response to these different combinations.

In some embodiments, the light source 315 is used to project light onto a user's eye or a portion of the user's eye. The light source 315 is a source of the light that is reflected off of the eye and captured by the eye tracker 240.

The IMU 330 is an electronic device that generates IMU tracking data based on measurement signals received from one or more of the position sensors 325. A position sensor 325 generates one or more measurement signals in response to motion of the NED 305. Examples of position sensors 325 include: one or more accelerometers, one or more gyroscopes, one or more magnetometers, another suitable type of sensor that detects motion, a type of sensor used for error correction of the IMU 330, or some combination thereof. The position sensors 325 may be located external to the IMU 330, internal to the IMU 330, or some combination thereof.

Based on the one or more measurement signals from one or more position sensors 325, the IMU 330 generates IMU tracking data indicating an estimated position of the NED 305 relative to an initial position of the NED 305. For example, the position sensors 325 include multiple accelerometers to measure translational motion (forward/back, up/down, left/right) and multiple gyroscopes to measure rotational motion (e.g., pitch, yaw, and roll). In some embodiments, the IMU 330 rapidly samples the measurement signals and calculates the estimated position of the NED 305 from the sampled data. For example, the IMU 330 integrates the measurement signals received from the accelerometers over time to estimate a velocity vector and integrates the velocity vector over time to determine an estimated position of a reference point on the NED 305. Alternatively, the IMU 330 provides the sampled measurement signals to the controller 310, which determines the IMU tracking data. The reference point is a point that may be used to describe the position of the NED 305. While the reference point may generally be defined as a point in space; however, in practice the reference point is defined as a point within the NED 305 (e.g., a center of the IMU 330).

The imaging device 335 may be used to capture a representation of the user's hands over time for use in tracking the user's hands (e.g., by capturing multiple images per second of the user's hand). To achieve a more accurate capture, the imaging device 335 may be able to capture depth data of the local area or environment. This may be achieved by various means, such as by the use of computer vision algorithms that generate 3D data via detection of movement in the scene, by the emission of a grid pattern (e.g., via emission of an infrared laser grid) and detection of depth from the variations in the reflection from the grid pattern, from computation of time-of-flight of reflected radiation (e.g., emitted infrared radiation that is reflected), and/or from the user of multiple cameras (e.g., binocular vision/stereophotogrammetry). The imaging device 335 may be positioned to capture a large spatial area, such that all hand movements within the spatial area are captured. In one embodiment, more than one imaging device 335 is used to capture the user's hands.

In another embodiment, the imaging device 335 may also capture images of one or more objects in the local area, and in particular the area encompassing the field of view of a user wearing an eyewear device that includes the NED 305. The imaging device 335 may also capture depth data of these one or more objects in the local area according to any of the methods described above.

Although the imaging device 335 is illustrated in FIG. 3 as being separate from the NED 305, in some embodiments the imaging device is attached to the NED 305, e.g., attached to the frame 105.

The imaging device 335 may include one or more cameras, imaging sensor, one or more video cameras, any other device capable of capturing images, or some combination thereof. Additionally, the imaging device 335 may include one or more hardware and software filters (e.g., used to increase signal to noise ratio). Image tracking data is communicated from the imaging device 335 to the controller 310, and the imaging device 335 receives one or more calibration parameters from the controller 310 to adjust one or more imaging parameters (e.g., focal length, focus, frame rate, ISO, sensor temperature, shutter speed, aperture, etc.).

The input interface 340 is a device that allows a user to send action requests to the controller 310. An action request is a request to perform a particular action. For example, an action request may be to start or end an application or to perform a particular action within the application. The input interface 340 may include one or more input devices. Example input devices include: a keyboard, a mouse, a game controller, or any other suitable device for receiving action requests and communicating the received action requests to the controller 310. In one embodiment, the input interface 340 includes one or more touch sensitive sensors, such as the touch sensitive sensors 120A and 120B. In another embodiment, the input interface 340 includes one or more radio frequency (RF) signal receivers. These may be used to receive radio signals from RF identifiers in the local area, and in some cases to determine a distance (based on signal strength) and position (based on triangulation or other method) of the RF identifier. An action request received by the input interface 340 is communicated to the controller 310, which performs an action corresponding to the action request. In some embodiments, the input interface 340 may provide haptic feedback to the user in accordance with instructions received from the controller 310. For example, haptic feedback is provided if an action request is received, or the controller 310 communicates instructions to the input interface 340 causing the input interface 340 to generate haptic feedback if the controller 310 performs an action.

The controller 310 provides content to the NED 305 for presentation to the user in accordance with information received from one or more of: the imaging device 335, the NED 305, the input interface 340, and the eye tracker 240. In the example shown in FIG. 3, the controller 310 includes an application store 345 and a tracking module 350. Some embodiments of the controller 310 have different modules than those described herein. Similarly, the functions further described below may be distributed among components of the controller 310 in a different manner than is described herein. In one embodiment, the controller 310 is a component within the NED 305.

The application store 345 stores one or more applications for execution by the controller 310. An application is a group of instructions, that when executed by a processor, generates content for presentation to the user. Content generated by an application may be in response to inputs received from the user via movement of the NED 305, the input interface 340, or the eye tracker 240. Examples of applications include: gaming applications, conferencing applications, video playback application, or other suitable applications.

The tracking module 350 calibrates the NED system 300 using one or more calibration parameters and may adjust one or more calibration parameters to reduce error in determination of the position of the NED 305. For example, the tracking module 350 adjusts the focus of the imaging device 335 to obtain a more accurate position for observed locators on the NED 305. Moreover, calibration performed by the tracking module 350 also accounts for information received from the IMU 330. Additionally, if tracking of the NED 305 is lost, the tracking module 350 re-calibrates some or all of the NED system 300.

The tracking module 350 tracks movements of the NED 305 using image tracking information from the imaging device 335. The tracking module 350 determines positions of a reference point of the NED 305 using observed locators from the image tracking information and a model of the NED 305. The tracking module 350 also determines positions of a reference point of the HMD 305 using position information from the IMU tracking information. Additionally, in some embodiments, the tracking module 350 may use portions of the IMU tracking information, the image tracking information, or some combination thereof, to predict a future location of the NED 305. The tracking module 350 provides the estimated or predicted future position of the NED 305 to the engine 355.

In one embodiment, the tracking module 350 is used to track movement of the digits of the user's hands and the hands themselves in order to recognize various poses for the user's hand. Each pose indicates a position of a user's hand. By detecting a combination of multiple poses over time, the tracking module 350 is able to determine a gesture for the user's hand. These gestures may in turn translate into various inputs to the system. For example, a movement using a single digit in one direction may translate into a button press input in the system.

In one embodiment, the tracking module 350 uses a deep learning model to determine the poses of the user's hands. The deep learning model may be a neural network, such as a convolutional neural network, or a residual neural network. The neural network may take as input feature data extracted from raw data from the imaging device 335 of the hand, e.g., depth information of the user's hand, or data regarding the location of locators on any input device worn on the user's hands. The neural network may output the most likely pose that the user's hands are in. Alternatively, the neural network may output an indication of the most likely positions of the joints of the user's hands. The joints are positions of the user's hand, and may correspond to the actual physical joints in the user's hand, as well as other points on the user's hand that may be needed to sufficiently reproduce the motion of the user's hand in a simulation.

If the neural network outputs the positions of joints, the tracking module 350 additionally converts the joint data into a pose, e.g., using inverse kinematics principles. For example, the position of various joints of a user's hand, along with the natural and known restrictions (e.g., angular, length, etc.) of joint and bone positions of the user's hand allow the tracking module 350 to use inverse kinematics to determine a most likely pose of the user's hand based on the joint information. The pose data may also include an approximate structure of the user's hand, e.g., in the form of a skeleton, point mesh, or other format.

The neural network is trained using training data. In one embodiment, the training data is generated from a multiple camera array, such as multiple imaging devices 335, that captures hand movements in different poses with different hands from different users, and/or the locators on input devices worn by the different hands. The ground truth for this training data indicates joint positions and/or poses for the hands, and may be generated using human verification.

An additional neural network may be used by the tracking module 350 to determine a gesture from a particular series of poses. Such a neural network may be similarly trained, using as input data computed poses (or joints) and with output data indicating the most likely gesture. Other methods may be used by the tracking module 350 to determine the gesture from the pose, such as a measurement of the distances and positions between the digits of the hand and the positions of a series of poses in 3D space. If these distances and positions of each pose fall within certain thresholds, the tracking module 350 may indicate that a particular gesture is present.

Using such a method, the tracking module 350 is able to determine the likely poses of a user's hands, and with the determination of the poses, the tracking module 350 may be able to match the movement of the user's hands with predefined gestures. These gestures may be used to indicate various actions in an augmented reality environment.

Additional details regarding the tracking and determination of hand positions using imaging devices and input devices are described in U.S. application Ser. No. 15/288, 453, filed Oct. 7, 2016, and U.S. App. No. 62/401,090, filed Sep. 28, 2016, both of which are incorporated by reference in their entirety.

In another embodiment, the tracking module 350 is also capable of recognizing objects in images captured by the imaging device 335. To perform this function, the tracking module 350 may first be trained on a large corpus of labeled object data, or be coupled to a pre-trained image recognition system, which may be on an online system. In the former case, the tracking module 350 includes a machine learning model (e.g., a convolutional neural network) and is trained on a standard image-object library (e.g., ImageNet), or on a large set of user-provided images from an online system. These user-provided images may include a large number of images of user's faces, and other objects, as well as a labeling of these faces and objects by users (e.g., using face tagging, captions, etc.). Alternatively, in the latter case, the online system itself already includes a machine learning model trained on the aforementioned user-provided and labeled images. For example, the online system may already have an object recognition system which receives images and outputs a label for each. The model on the online system is used instead of any model on the controller 310 to perform the object recognition in this case. After recognizing a face, the tracking module 350 may be able to track the location of the user in the field of view provided by the NED 305 to the user. This may be achieved by continuously recognizing faces in each frame captured by the imaging device 335. Once a user's face is recognized, the tracking module 350 can indicate the location of the user's face, and the boundaries of the face (e.g., the pixels corresponding to the recognized face) in the captured image. This can be translated to a location of the user's face in the user's field of view provided by the NED 305 through the optical assembly 310.

In one embodiment, the controller 310 additionally includes an execution engine 355. The execution engine 355 executes applications within the system environment 300 and receives position information, acceleration information, velocity information, predicted future positions, or some combination thereof, from the NED 305, input interface 340, and/or the tracking module 350. Based on the received information, the execution engine 355 determines content to provide to the NED 305 for presentation/display to the user. For example, if the received information indicates that the user has looked to the left, the execution engine 355 generates content for the NED 305 that is based off the user's movement in the augmented reality environment. Similarly, if information received from the tracking module 350 indicates the user's hand makes a particular gesture, the execution engine 355 generates content based on the identified gesture. In addition, if the information received from the NED 305 indicates a particular gaze of the user, the execution engine 355 may generate content based on that gaze. This content may include an update to the optical assembly 360 in the NED 305, such that content displayed to a user wearing the NED 305 changes.

The execution engine 355 may also perform an action within an application executing on the controller 310 in response to an action request received from the input interface 340 and provides feedback to the user that the action was performed. The provided feedback may be visual or audible feedback via the NED 305. For example, the execution engine 355 may receive an action from the input interface 340 to open an application, and in response, the execution engine 355 opens the application and presents content from the application to the user via the NED 305.

In one embodiment, the execution engine 355 determines the current pose of the user's hand based on raw joint data received from the tracking module 350. In another embodiment, the execution engine 355 detects the gestures of the user's hand based on the pose data. The methods in which the execution engine 355 determines poses and gestures are similar to the methods described above for the tracking module 350. In one embodiment, the execution engine 355 performs object recognition similar to the method described above for the tracking module 350.

In addition to determining the current pose of the user's hand(s), the execution engine 355 may also provide output to the optical assembly 360 in accordance with a set of display instructions (e.g., pixel data, vector data, etc.). This output to the electronic display 155 may include a virtual recreation (using computer graphics) of the user's hands, as well as other objects (virtual or otherwise), such as outlines of objects in the local area, text, graphics, other elements that coincide with objects within a field of view of a user wearing the NED 305, and so on.

In one embodiment, the display instructions include information about users that are tracked by the tracking module 350. This information may be received from the aforementioned online system, in response to the execution engine 355 requesting this information for users recognized by the online system from the online system. As will be further described below, the execution engine 355 transmits display instructions to the optical assembly 360 to display this received information at a location near the recognized user's faces.

NED Filter Interface in AR

The following figures illustrate a near eye display (NED) system (e.g., NED system 300) having object recognition and gesture tracking capabilities that allow a NED 305 to present a filter to a user to provide a user with additional information about objects, such as users, in the local area.

In one embodiment, users in the local area are recognized using a facial or object recognition system from an online system based on images captured by the NED system. The NED system further displays an overlay to a user wearing the eyewear device including the NED system which indicates information about the recognized users. The system may also allow the user to update his or her own information using a virtual contextual menu and tracking of the user's hand when selecting options from the menu. Such a system improves communication amongst users, especially in a collaborative environment. For example, users may be able to immediately identify other users whose information indicates that they are available to work on a project, etc. The direct overlay of the information for only those users in the local area provides a convenience over using a computer to search for the same users from a massive list and collecting data for each user manually.

Figure 4A:
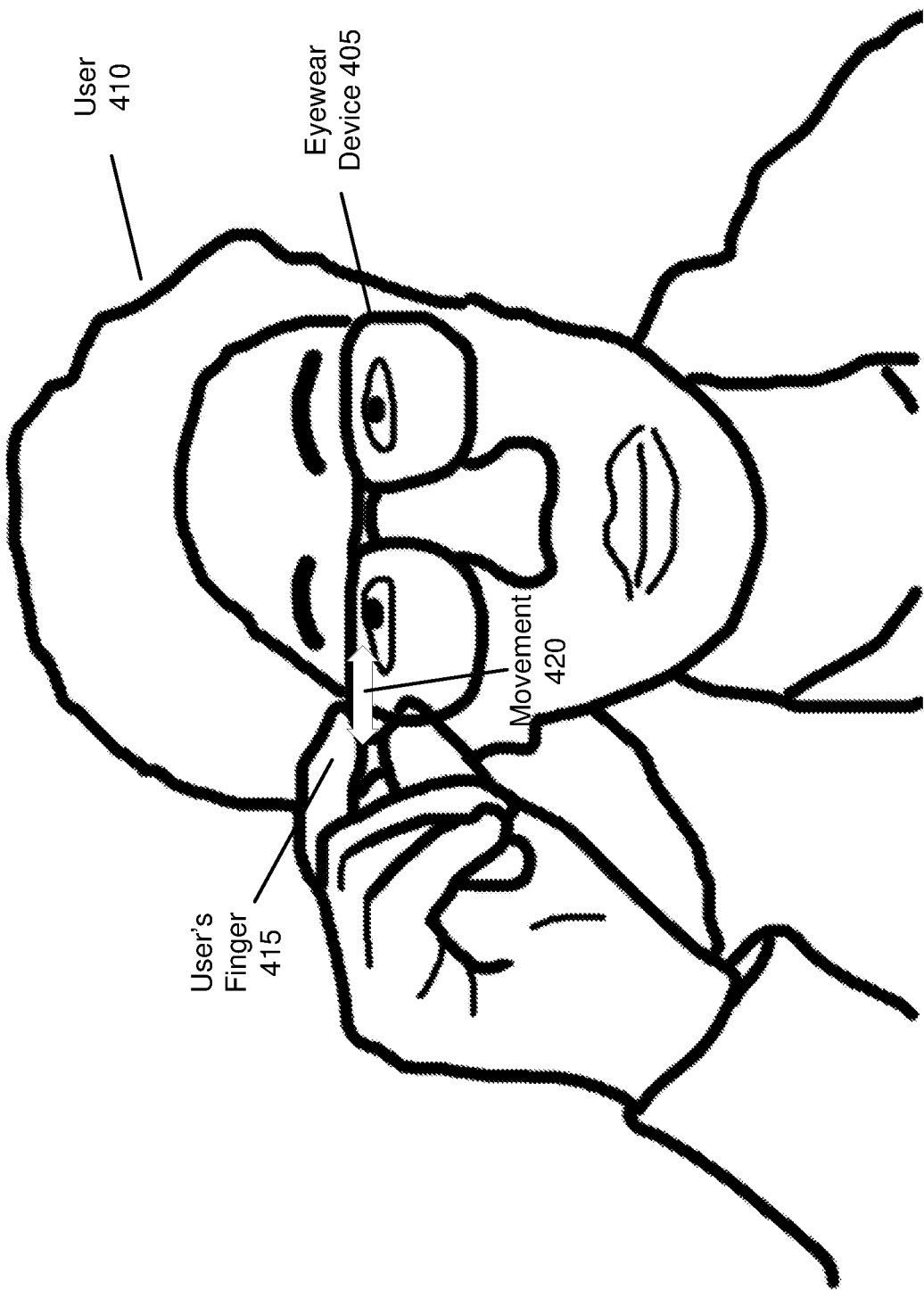
FIG. 4A illustrates an example of an interaction using an eyewear device that provides a NED filter, according to an embodiment.

FIG. 4A illustrates an example of an interaction using an eyewear device that provides a NED filter, according to an embodiment. FIG. 4A illustrates an eyewear device 405 which may be similar to the eyewear device 405 described in FIG. 1 and includes the components described in the NED system 300 of FIG. 3, such as the controller 310. The eyewear device 405 includes at least one touch sensitive sensor, which may be similar to the touch sensitive sensor 120B described with reference to FIG. 1. The eyewear device 405 is worn by the user 410.

The controller of the eyewear device 405, such as the controller 310 (not shown), may receive from the touch sensitive sensor of the eyewear device 405 an indication that contact is made with the touch sensitive sensor. If the controller 310 receives a specific pattern of contact with the touch sensitive sensor, such as two swipes by the user's finger 415 from the user's bridge to the user's temple (as indicated at 420) which are separated by a duration that is within a threshold period of time, the controller 310 determines that a request has been made by the user to activate a NED filter mode. In this mode, the controller 310 tracks objects in the local area and retrieves information from an online system about these objects. This information is displayed to the user, as described below.

Figure 4B:
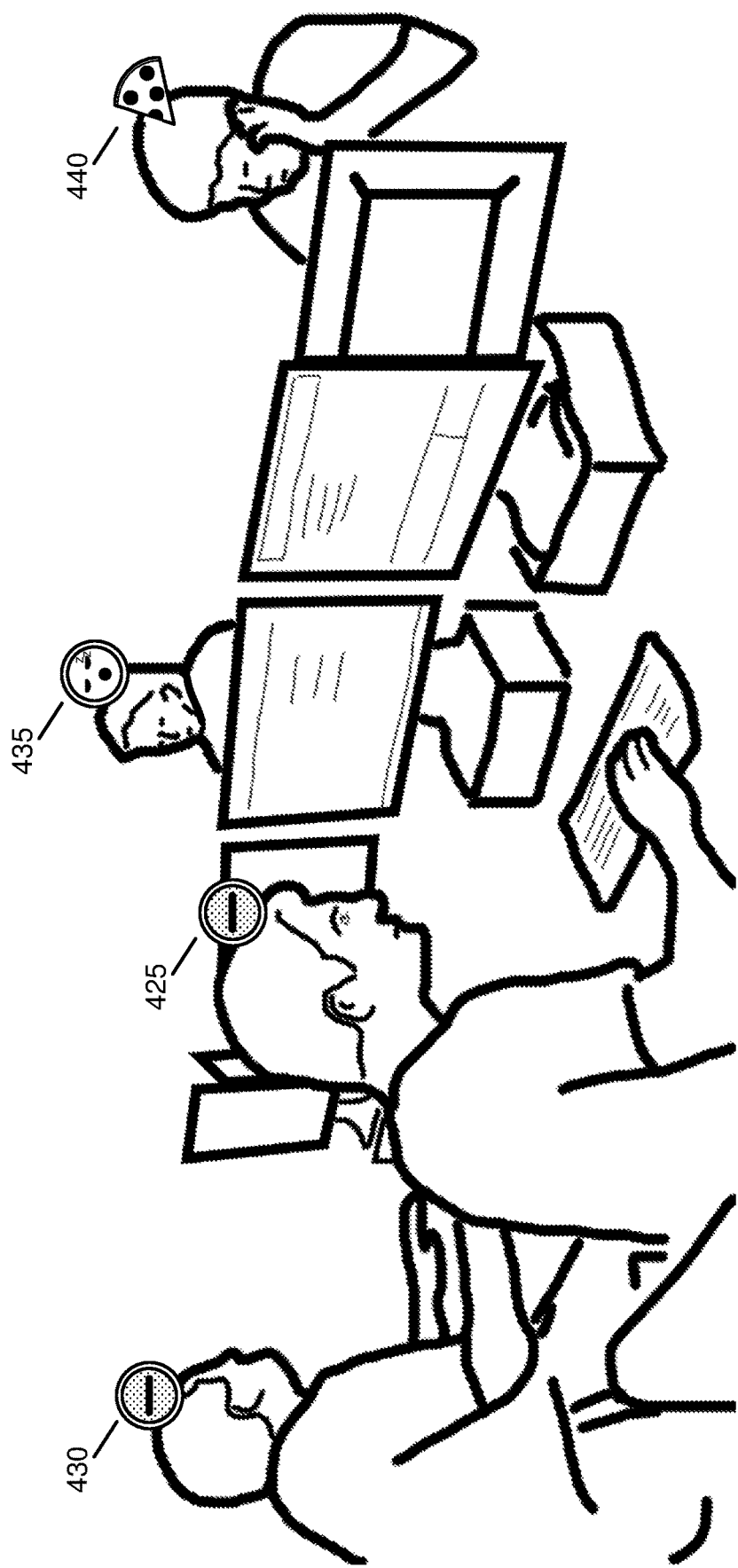
FIG. 4B illustrates an example NED display filter applied to the NED of FIG. 4A, according to an embodiment.

FIG. 4B illustrates an example NED display filter applied to the NED of FIG. 4A, according to an embodiment. The perspective in FIG. 4B is that of the user 410 viewing the local area through the eyewear device 405. Furthermore, the user 410 has activated the NED filter mode, which causes the controller 310 of the eyewear device 405 to detect the one or more objects in the local area using the object recognition system described above with reference to FIG. 3. In one embodiment, the objects recognized are users in the local area. Four users are shown in FIG. 4B sitting around a large desk. After activating the NED filter mode, the controller 310 identifies and tracks the four users using the object recognition system. The controller 310 tracks each user by recognizing the user using the object recognition system in each new captured image of the local area, using a RF signal emitted from an RF locator device on one or more of the users, or some combination thereof.

The controller 310 further requests supplemental information for these users from an online system. The online system may include user profile information for users, including the four users that are shown here. This user profile information may include status information, demographic data, user details (e.g., name, residence, date of birth), social networking information, uploaded media, calendar information, contact information, emails, and so on. Here, the controller 310 first displays supplemental information that indicates the status of each user. The controller 310 displays the supplemental information by sending an update to the optical assembly 360 of the NED 305 of the eyewear device 405 to display a status icon near to (i.e., within a threshold distance) of the position of a recognized user's head in the artificial reality environment presented by the NED 305. As shown, the NED 305 presents the status icons 425, 430, 435, and 440 for each of the four users (the status icons may be, e.g., emoticons, an icon indicating busy status, available status, etc.). Other information that may be displayed can include language translations, a night vision filter, information such as calories for recognized food objects, virtual spaces representing a file storage, and so on.

Note that the position of a recognized user in the AR environment can be is determined by the controller 310 by translating the tracked position of the recognized user to a coordinate position in the display presented by the optical assembly 360 of the NED 305. This translation may be achieved through lookup table or via transformation computation (e.g., a projection or other matrix computation).

Figure 4C:
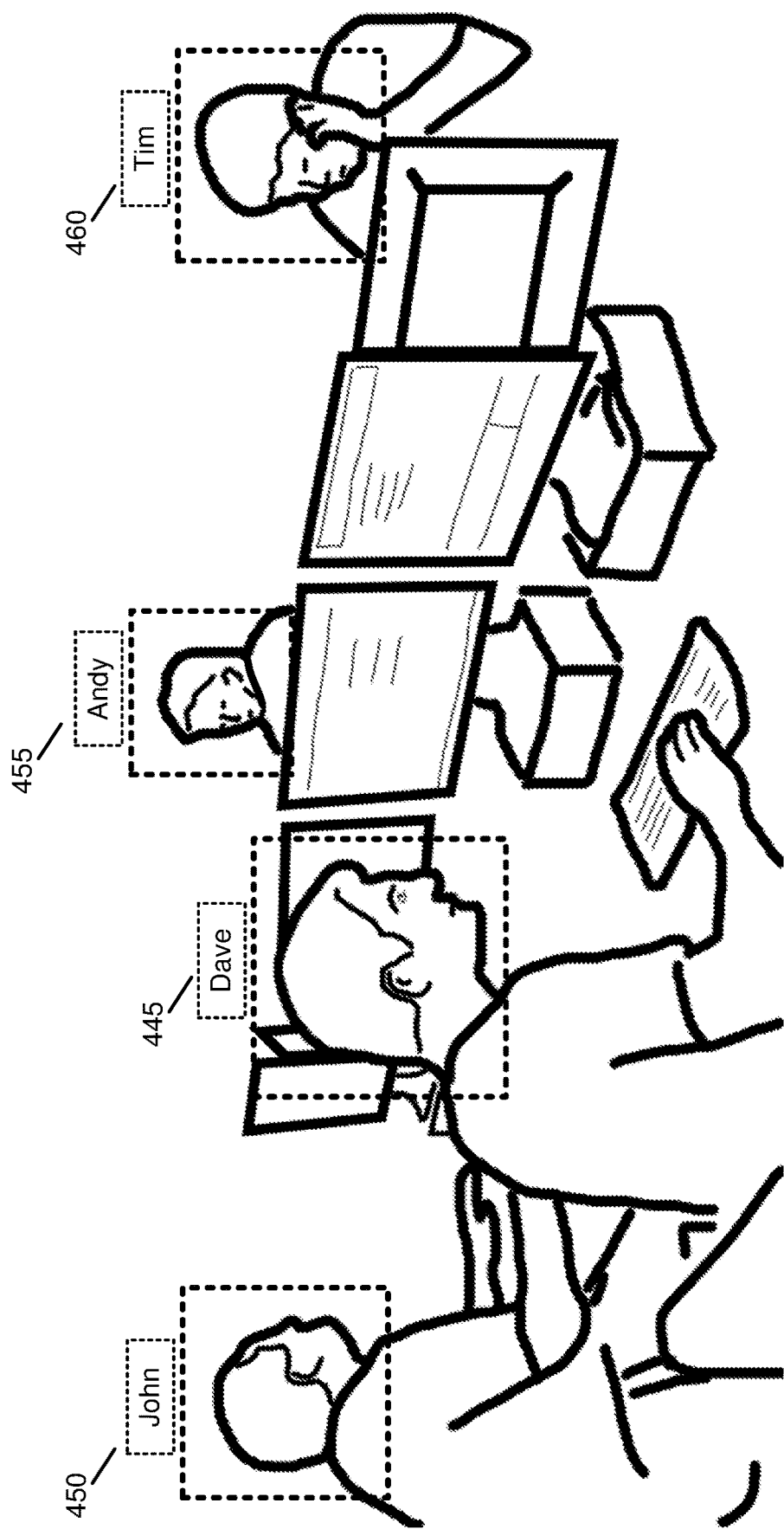
FIG. 4C illustrates a continuation of the example of the NED of FIG. 4B of the NED display filter as applied to the NED of FIG. 4A, according to an embodiment.

FIG. 4C illustrates a continuation of the example of the NED of FIG. 4B of the NED display filter as applied to the NED of FIG. 4A, according to an embodiment. In FIG. 4C, the controller 310 causes the optical assembly 360 of the eyewear device 405 to show additional information for the recognized users in the scene. In this case, this additional information includes the identifiers 445, 450, 455, and 460, which indicate the names of each of the users. The display of the additional information may have been caused by the user interacting once more with the touch sensitive sensor on the eyewear device 405 (e.g., using a similar motion used to activate the NED filter mode). Alternatively, the controller 310 may cycle through the information that is received from the online system and displays portions of that information after set intervals of time.

Note that although information is shown for the four users in the local area in the figures shown above, in other embodiments, the controller 310 is also configured to display (via instructions to the optical assembly 360) information about other objects in the local area. The controller 310 may perform object recognition on images captured of the local environment, and provide information for recognized objects. For example, the controller 310 may retrieve information regarding recognized products in a grocery store, or for objects recognized on a display (e.g., a television), etc. Furthermore, the controller 310 may recognize the user's hands, and upon detecting a specific gesture of the user's hand against an object in the scene, may provide additional information about that object (after identifying the object using object recognition). The object recognition and/or retrieval of the information about objects may be performed either by the controller 310 or using an online system (e.g., an external server).

Additionally, in some embodiments, the controller 310 further utilizes additional tracking indicators in the local area to assist in the recognition and tracking of objects. As noted above, the objects in the environment may have RF identifiers, which may be received by the eyewear device 405 via one or more RF receivers. The controller 310, via the signals received from the RF receivers, and through various signal source locating mechanisms (e.g., triangulation, time-of-flight, Doppler shift), may determine the position of an object that has an RF identifier using the RF signals from the object. This information may be used to augment (e.g., adjust for error) the image based object recognition system, or may be used in place of the image based object recognition system (e.g., in the case where the image based object recognition system fails or has high error/uncertainty). Other tracking indicators, such as retroreflectors (which may respond to a non-visible light signal from the eyewear device 405), high contrast locators, QR codes, barcodes, identifying image patterns, and so on, may also be used by the controller 310 to assist in recognizing and tracking objects in the local area.

Figure 5:
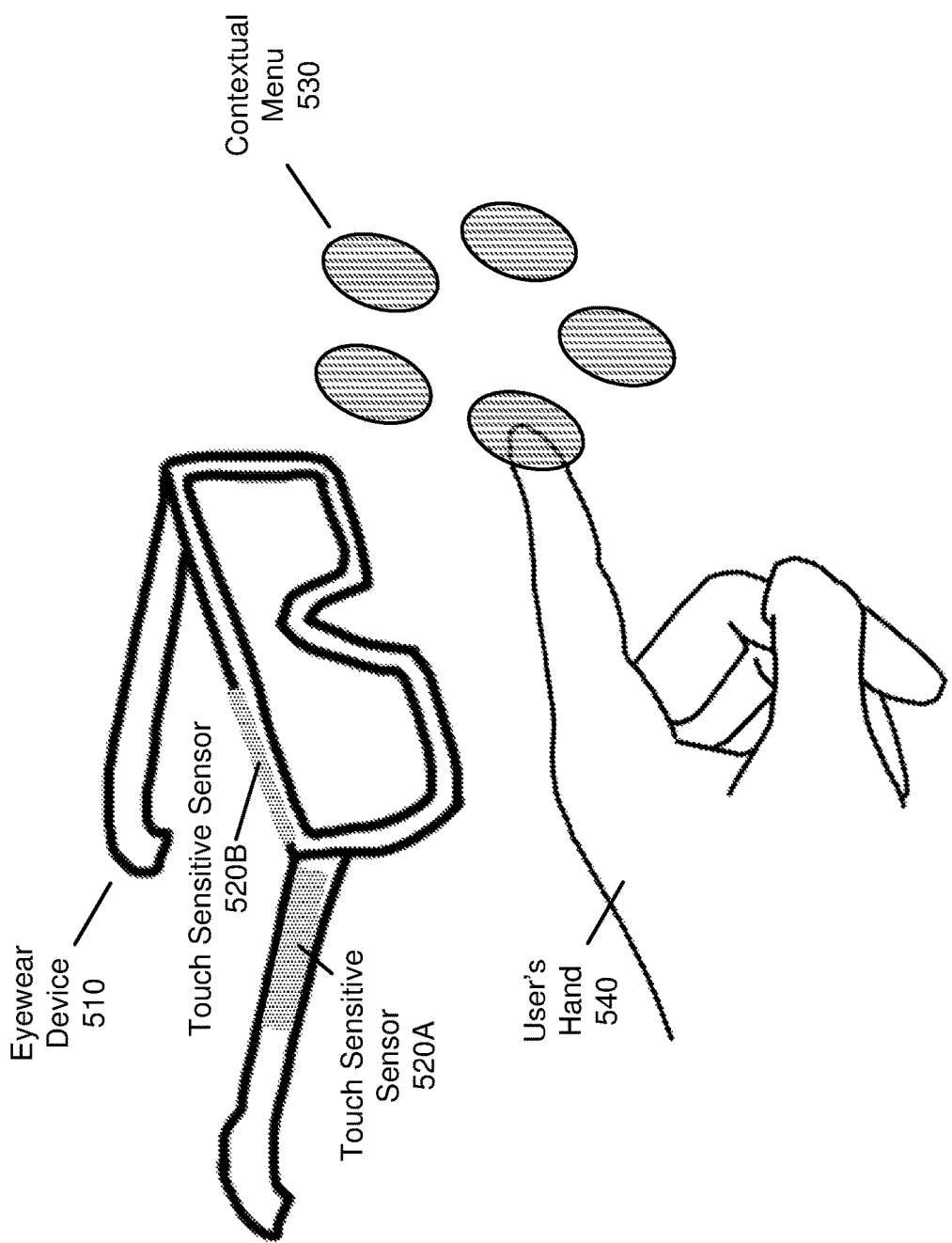
FIG. 5 illustrates an example of a contextual menu in an eyewear device that provides a NED filter, according to an embodiment.

FIG. 5 illustrates an example of a contextual menu in an eyewear device 510, according to an embodiment. The view in FIG. 5 is of the eyewear device 510 and the AR environment. The eyewear device 510 includes the touch sensitive sensors 520B and 520A. In one embodiment, the eyewear device 510 includes the NED system 300 described with reference to FIG. 3, and thus includes the controller 310, optical assembly 360, and so on. Upon activation of one or both of the touch sensitive sensors 520A and 520B (e.g., by touching the touch sensitive sensor 520B twice within a threshold duration), the controller 310 (not shown) of the eyewear device 510 instructs the optical assembly 360 of the eyewear device 510 to display the contextual menu 530 in the artificial environment. The contextual menu 530 is represented here by a ring of circular objects, with each circle representing a contextual menu option. However, in other embodiments, they may take on other shapes and features. For example, they could be spheres, cubes, text, or shaped (e.g., skeuomorphically) like real-world objects such as buttons, etc.

The controller 310 may further detect that the user's hand 540 is performing a touch gesture with one of the contextual menu options. A touch gesture is detected when the controller 310 detects that the distal end of one of the user's fingers is within a threshold distance of one of the contextual menu options (e.g., 2 mm) in the artificial reality environment.

Once the touch gesture is detected, the controller 310 may execute an option corresponding to the selected or touched contextual menu option.

In addition, the controller 310 may detect a pinch-pull gesture with one of the contextual menu options. The pinch-pull gesture is detected when the distal ends of the user's index finger and thumb are within a threshold distance of each other (e.g., 5 mm) and they surround one of the contextual menu options. Furthermore, the user's hand moves in a direction towards the eyewear device 510 (i.e., that reduces the distance between the user's hand and the eyewear device). This type of gesture may be used for a contextual menu option that indicates a status indicator. Upon detecting such a gesture, the controller 310 may apply the status indicator indicated by the selected contextual menu option to the user. For example, the contextual menu option may indicate a status indicator of "busy." If the user pinches this option and pulls it towards the user, the controller 310 may apply the "busy" status indicator to the user, and transmit this status to the online system. Other users with eyewear devices can subsequently see this updated status (which may be updated in real time) for the user.

Figure 6:
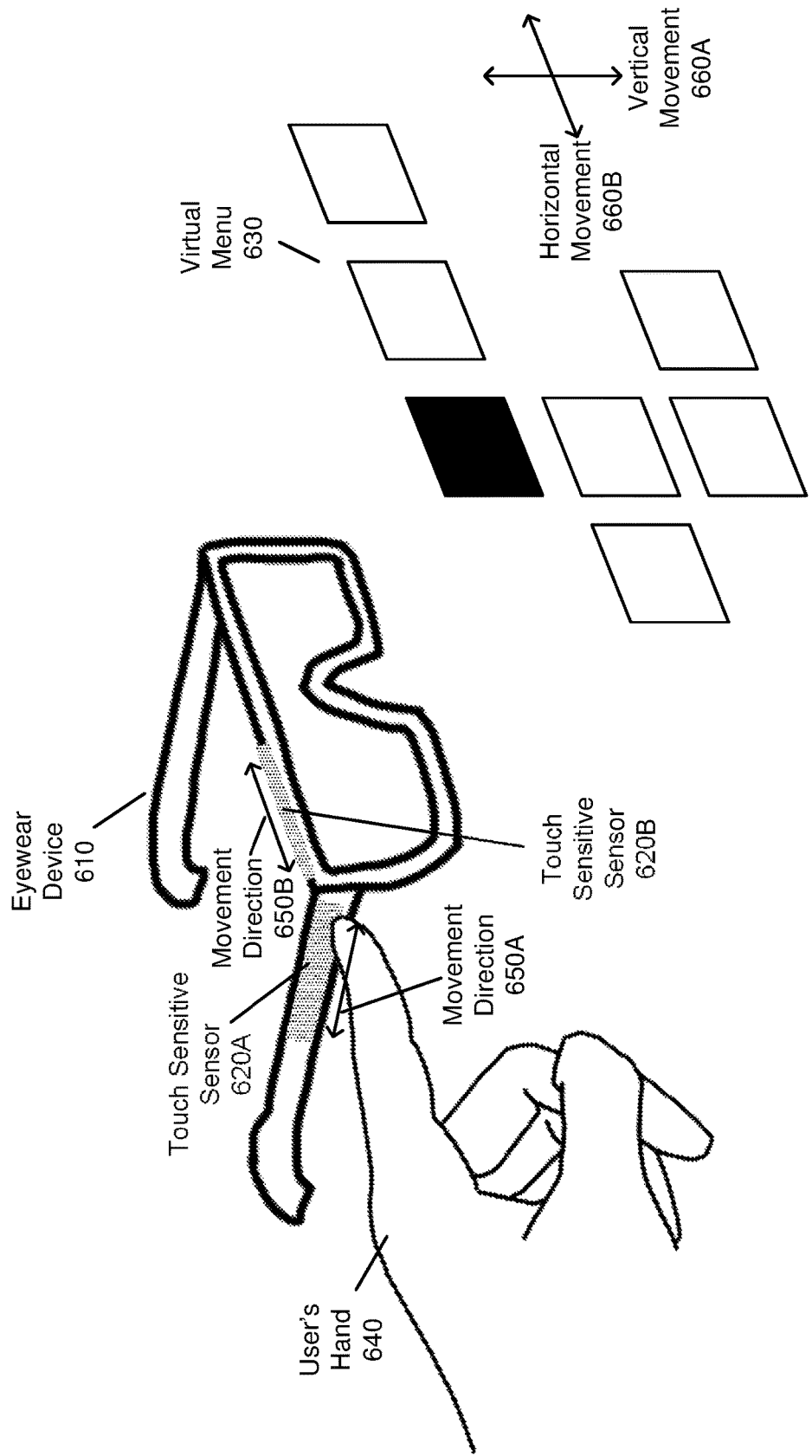
FIG. 6 illustrates an example of a virtual menu displayed via the optical element of an eyewear device and interacted with using touch sensitive sensors of the eyewear device, according to an embodiment

FIG. 6 illustrates an example of a virtual menu displayed via the optical element of an eyewear device 610 and interacted with using touch sensitive sensors of the eyewear device 610, according to an embodiment. The view in FIG. 6 is of the eyewear device 610 and the AR environment. The eyewear device 610 includes the touch sensitive sensors 620B and 620A. In one embodiment, the eyewear device 610 includes the NED system 300 described with reference to FIG. 3, and thus includes the controller 310, optical assembly 360, and so on.

Upon activation of one or both of the touch sensitive sensors 620A and 620B, the controller 310 (not shown) of the eyewear device 610 instructs the optical assembly 360 of the eyewear device 610 to display the virtual menu 630 in the artificial environment. The activation of the touch sensitive sensors 620A and 620B for the display of the virtual menu 630 may occur with a spread gesture. The spread gesture is detected by the controller 310 when the controller 310 detects two of the user's fingers of the user's hand 640, each on a different touch sensitive sensors 620A and 620B, and further detect a movement between the two fingers along each of the touch sensitive sensors 620A and 620B such that the distance between the two fingers is increases past a threshold distance. The virtual menu 630 is represented here by a set of rectangular planes, with each rectangular plane representing a menu option or some data or other element. However, in other embodiments, the virtual menu 630 takes on other shapes, features, arrangements, appearances, and so on.

The controller 310 may further detect further gestures from the user's hand 640 with either of the touch sensitive sensors 620A and 620B. In one embodiment, the controller 310 detects that a finger of the user's hand 640 is interacting with the touch sensitive sensor 620B using a sliding motion, by moving the finger in a sliding motion along the touch sensitive sensor 620B, e.g., from the side of the frame of the eyewear device 610 to the center of the eyewear device 610, while staying in contact with the touch sensitive sensor 620B (or vice versa, e.g., from the center of the frame to the side). This movement direction is indicated by the movement direction 650B. Depending on the direction of this sliding motion, the controller 310 may submit display instructions to the optical assembly 360 of the NED system 300 of the eyewear device 610 to move the virtual menu 630 in the direction of the sliding gesture. For example, the movement of the virtual menu 630 matches the direction of the sliding gesture. This horizontal movement of the virtual menu 630 is indicated by horizontal movement 660B. Each detection of a sliding gesture may move the virtual menu 630 by a distance equal to one rectangular plane of the virtual menu 630 along the dimension of the movement (i.e., the horizontal dimension).

In one embodiment, one of the rectangular planes may be highlighted with a different color, or otherwise be differently indicated from the other rectangular planes. The rectangular plane that is differently indicated or highlighted may always be a central rectangular plane element. This central rectangular plane element indicates the position of the rectangular plane in the virtual menu 630 that is located at a central location relative to the eyewear device 610 in the augmented environment presented by the optical assembly 360 of the eyewear device 610. The central rectangular plane changes, depending on which rectangular plane of the virtual menu 630 is in this central location. Thus, the central rectangular plane becomes a different rectangular plane of the virtual menu 630 after the virtual menu 630 is moved by the sliding gesture.

In another embodiment, a sliding gesture may be performed by the user and detected by the controller 310 against the touch sensitive sensor 620A. This sliding gesture may include a movement of a user's finger against the touch sensitive sensor 620A from the rear of the eyewear device 610 (near the temple tips) to the front of the eyewear device 610 (near the lenses/optical assembly). This movement direction is indicated by the movement direction 650A. This sliding gesture may cause the controller 310 to submit display instructions to the optical assembly 360 to move the virtual menu 630 up or down by a distance equal to the vertical dimension of one of the rectangular planes of the virtual menu 630. The direction of the vertical movement may correspond to a direction of the sliding gesture (e.g., vertical movement up when the user slides towards to rear of the eyewear device).

In another embodiment, a pinch gesture may be performed by the user and detected by the controller 310 against the touch sensitive sensor 620A and 620B. This pinch gesture is formed when two of the user's fingers each come in contact with the touch sensitive sensor 620A and 620B, and the fingers move along the two touch sensitive sensors 620B and 620A towards each other, with the sum movement of the fingers greater than a threshold distance. In response to detecting the pinch gesture, the controller 310 may cause the optical assembly 360 to clear the display of the virtual menu 630, such that the virtual menu 630 is no longer displayed.

In another embodiment, a sensor touch gesture may be performed by the user and detected by the controller 310 against the touch sensitive sensor 620A or 620B. This sensor touch gesture is formed when one of the user's fingers contacts one of the touch sensitive sensors 620A or 620B and subsequently is removed from the respective touch sensitive sensor at the same location, without any sliding motion. Upon detecting this sensor touch gesture, the controller 310 may execute instructions related to the current central rectangular plane menu option or element. In another embodiment, the central rectangular plane menu option, or any of the other options in the virtual menu 630, may instead be selected by a touch gesture, as described above in FIG. 5, by the user's finger against any of the virtual menu 630 options in the augmented environment.

Note that after each of the above gestures is performed, the controller 310 may further display some sort of feedback using the optical assembly 360. This feedback may be instantaneous to the detection of the gesture, and may subsequently gradually fade away after the gesture is completed. Furthermore, any of the gestures above, e.g., the sliding gesture, may be used to move between the NED filter screens described above with reference to FIGS. 4B and 4C. For example, after detecting the sliding gesture, the controller 310 may move from a display similar to that in FIG. 4B, to one similar to that in FIG. 4C.

In yet another embodiment, the virtual menu 630 may appear to be a virtual dial, or a circular plane with various menu options spaced radially from the center of the circular plane. The various gestures described above, e.g., the sliding gesture, may cause the controller 310 to update the display to move between the options of the virtual dial, or to move between different virtual dials. Other virtual menu shapes and options may also be substituted for the rectangular planes shown in the virtual menu 630, with the various gestures described above used in similar methods to interface between the elements of the virtual menu 630.

In another embodiment, the controller 310 determines an eye-gaze of the user, in accordance with the methods described above for the eye tracker 240 of FIG. 2. The controller 310 further determines that the touch sensitive sensor 620A or 620B of the NED system is activated by a sensor touch gesture, as described above. In such a case, if the eye-gaze of the user is directed towards an element of the virtual menu 630, the controller 310 executes instructions that are associated with that element. This gaze activation of elements may itself be activated by executing instructions related to another option in the virtual menu 630, and deactivated by the same.

Exemplary Flow

FIG. 7 is a flowchart illustrating a method for providing a NED filter in an eyewear device, according to an embodiment. In one embodiment, the steps in the flowchart may be performed by the controller 310 of the NED system 300 of FIG. 3. In another embodiment, the steps may be performed by another component as described in the NED system 300. Although a particular order is implied by the flowchart, in other embodiments the steps in the flowchart may be performed in a different order.

Initially, the controller 310 determines 710 a position of an object within the local area using the captured one or more images and location information associated with the object. For example, the controller 610 may be coupled to an imaging device (e.g., imaging device 335) which captures images of the local area. Using an object recognition system, such as one provided by an online system, the controller 310 recognizes objects in the captured images, and determines the position of these recognized objects in the images.

The controller 310 accesses 720 supplemental information regarding the object. This may include information about the object received from an online system, e.g., user profile information. For example, if the recognized object is a person, the controller 310 may further retrieve information about this person from the online system. This information may include status information about the person if the person is a user of the online system and has corresponding user profile information stored at the online system, profile information of the person, the person's name, and so on.

The controller 310 updates 730 display instructions to cause a substantially transparent electronic display (e.g., the optical assembly 360) to display at least a portion of the supplemental information about the object. The display of the at least a portion of the supplemental information may be positioned within a threshold distance of the determined position of the object in an augmented reality environment as presented via the substantially transparent electronic display. For example, in the above example where the recognized object is a person, the display instructions may cause a status information for the person to be displayed as an icon at a position that is to the top and left side of the person's head as viewed through the NED by the wearer of the NED. As another example, if the recognized object is an inanimate object or not a person, the display instructions may cause an informational description of the object to be displayed to the right side of the object as viewed through the NED.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system comprising:
    a near eye display (NED) comprising:
        an optical assembly that is substantially transparent and having an electronic display that is configured to display images in accordance with display instructions;
        an imaging device configured to capture one or more images of a portions of a local area surrounding the NED;
        a wearable frame coupled to the substantially transparent electronic display and having a touch sensitive sensor; and
    a controller configured to:
        determine a position of an object within the local area using the captured one or more images and location information associated with the object;
        access supplemental information regarding the object; and
        update the display instructions in response to determining an initiation of a display filter mode to cause the electronic display to display at least a portion of the supplemental information about the object, the display of the at least a portion of the supplemental information for the object positioned within a threshold distance of the determined position of the object in an augmented reality environment as presented via the electronic display, wherein the display filter mode is initiated by one or more activations of the touch-sensitive sensor, each of the one or more activations of the touch-sensitive sensor comprising a motion against the touch-sensitive sensor by a portion of the wearer's body, wherein the object is another person in the local area viewed by the wearer of the NED, and wherein the location information comprises distance and positional information is received from a wearable device worn by the person.

2. The system of claim 1, wherein the location information is received via a radio frequency (RF) identifier attached to a wearable device worn by the person.

3. The system of claim 1, wherein the object is a user, and the supplemental information includes user profile information received from an online system that stores a user profile associated with the user.

4. The system of claim 1, the NED further comprising a radio frequency (RF) receiver configured to receive radio signals, and wherein the controller is further configured to:
    receive a radio signal from the RF receiver, the radio signal received from an (RF) identifier attached to the object in the local area, each radio signal indicating an identifier for the attached object;
    determine the location information of the object in the local area using the RF identifier based on the distance and position of the radio signal from the RF identifier;
    transmit a request including the identifier from the RF identifier to an online system for the supplemental information; and
    receive from the online system the supplemental information associated with the identifier corresponding to a profile stored by the online system.

5. The system of claim 1, the NED further comprising a wearable frame coupled to the substantially transparent electronic display and having a touch sensitive sensor, and wherein the controller is further configured to:

update the display instructions in response to determining an initiation of a display filter mode, the display filter mode initiated by at least two separate activations of the touch-sensitive sensor, the activations separated by a maximum threshold duration, each activation of the touch-sensitive sensor comprising a transverse motion against the touch-sensitive sensor by one of a wearer's fingers.

6. The system of claim 1, wherein the location information is generated using object recognition to recognize the object in the captured images.

7. The system of claim 5, wherein the controller is further configured to:
   determine an initiation of a secondary display filter mode, the secondary display filter mode initiated after a previous initiation of the display filter mode by at least two separate activations of the touch-sensitive sensor that are separated by the maximum threshold duration; and
   update the display instructions to cause the substantially transparent electronic display to display a remainder of the supplemental information about the located objects, the display of the remainder of the supplemental information positioned within a threshold distance of the position of the corresponding located objects in the augmented reality environment as presented via the substantially transparent electronic display.

8. The system of claim 5, wherein the wearable frame comprises a secondary touch-sensitive sensor.

9. The system of claim 8, wherein the controller is further configured to:
   determine an initiation of a contextual menu display filter mode, the contextual filter mode initiated by at least two separate activations of the secondary touch-sensitive sensor that are separated by the maximum threshold duration; and
   update the display instructions to cause the substantially transparent electronic display to display a simulated contextual menu, the simulated contextual menu presented within a maximum threshold distance of the wearable frame within the augmented reality environment as presented by the substantially transparent electronic display.

10. The system of claim 9, wherein the simulated contextual menu includes a plurality of circularly arranged simulated objects, each simulated object representing a contextual menu option of the simulated contextual menu.

11. The system of claim 10, wherein the controller is further configured to:
   determine that a pose of the wearer's hand indicates a push gesture with one of the simulated objects representing contextual menu options, the push gesture formed by a movement of at least one of the wearer's fingers within a threshold distance from one of the simulated objects in the augmented reality environment;
   execute instructions corresponding to the contextual menu option associated with the intersected object; and
   update the display instructions to cause the substantially transparent electronic display to display an indication of the activation of the corresponding contextual menu option.

12. The system of claim 10, wherein the controller is further configured to:
   determine that a pose of the wearer's hand indicates a pinch-pull gesture with one of the simulated objects representing contextual menu options, the pinch-push gesture formed by a first movement of the wearer's hand to intersect one of the simulated objects, a second movement of the wearer's index finger and thumb such that the distance between the index finger and thumb is below a threshold value, and a third movement of the wearer's hand in a direction towards the wearer's body;
   execute instructions corresponding to the contextual menu option associated with a push-pull gesture of the intersected object; and
   update the display instructions to cause the non-opaque electronic display to display an indication of the activation of a push-pull option of the corresponding contextual menu option.

13. The system of claim 10, wherein the controller is further configured to:
   determine that a gaze of a wearer of the NED terminates at one of the simulated objects;
   detect an activation of the secondary touch-sensitive sensor; and
   execute instructions corresponding to the contextual menu option associated with the one of the simulated objects at which the wearer's gaze terminates.

14. A near eye display (NED) comprising:
   a substantially transparent electronic display that is configured to display images in accordance with display instructions;
   an imaging device configured to capture one or more images of a portions of a local area surrounding the NED;
   a wearable frame coupled to the substantially transparent electronic display and having a touch sensitive sensor; and
   a controller configured to:
      determine a position of an object within the local area using the captured one or more images and location information associated with the object;
      access supplemental information regarding the object; and
      update the display instructions in response to determining an initiation of a display filter mode to cause the electronic display to display at least a portion of the supplemental information about the object, the display of the at least a portion of the supplemental information for the object positioned within a threshold distance of the determined position of the object in an augmented reality environment as presented via the electronic display, wherein the display filter mode is initiated by one or more activations of the touch-sensitive sensor, each of the one or more activations of the touch-sensitive sensor comprising a motion against the touch-sensitive sensor by a portion of the wearer's body, wherein the object is another person in the local area viewed by the wearer of the NED, and wherein the location information comprises distance and positional information is received from a wearable device worn by the person.

15. The NED of claim 14, wherein the location information is received via a radio frequency (RF) identifier attached to a wearable device worn by the person.

16. The NED of claim 14, wherein at least the object is a user, and the supplemental information includes user profile information received from an online system that stores a user profile associated with the user.

17. The NED of claim 14, further comprising a radio frequency (RF) receiver configured to receive radio signals, and wherein the controller is further configured to:

receive a radio signal from the RF receiver, the radio signal received from an (RF) identifier attached to the object in the local area, each radio signal indicating an identifier for the attached object;

determine the location information of the attached object in the local area using the RF identifier based on the distance and position of the radio signal from the RF identifier;

transmit a request including the identifier from the RF identifier to an online system for the supplemental information; and receive from the online system the supplemental information associated with the identifier corresponding to a profile stored by the online system.

18. The NED of claim 14, further comprising a wearable frame coupled to the substantially transparent electronic display and having a touch sensitive sensor, and wherein the controller is further configured to:

update the display instructions in response to determining an initiation of a display filter mode, the display filter mode initiated by at least two separate activations of the touch-sensitive sensor, the activations separated by a maximum threshold duration, each activation of the touch-sensitive sensor comprising a transverse motion against the touch-sensitive sensor by one of a wearer's fingers.

19. The NED of claim 14, wherein the location information is generated using object recognition to recognize the object in the captured images.

20. The NED of claim 18, wherein the controller is further configured to:

determine an initiation of a secondary display filter mode, the secondary display filter mode initiated after a previous initiation of the display filter mode by at least two separate activations of the touch-sensitive sensor that are separated by the maximum threshold duration; and update the display instructions to cause the substantially transparent electronic display to display a remainder of the supplemental information about the located objects, the display of the remainder of the supplemental information positioned within a threshold distance of the position of the corresponding located objects in the augmented reality environment as presented via the substantially transparent electronic display.

21. The NED of claim 18, wherein the wearable frame comprises a secondary touch-sensitive sensor.

22. The NED of claim 21, wherein the controller is further configured to:

determine an initiation of a contextual menu display filter mode, the contextual filter mode initiated by at least two separate activations of the secondary touch-sensitive sensor that are separated by the maximum threshold duration; and update the display instructions to cause the substantially transparent electronic display to display a simulated contextual menu, the simulated contextual menu presented within a maximum threshold distance of the wearable frame within the augmented reality environment as presented by the substantially transparent electronic display.

23. The NED of claim 22, wherein the simulated contextual menu includes a plurality of circularly arranged simulated objects, each simulated object representing a contextual menu option of the simulated contextual menu.

24. The NED of claim 23, wherein the controller is further configured to:

determine that a pose of the wearer's hand indicates a push gesture with one of the simulated objects representing contextual menu options, the push gesture formed by a movement of at least one of a wearer's fingers within a threshold distance from one of the simulated objects in the augmented reality environment;

execute instructions corresponding to the contextual menu option associated with the intersected object; and update the display instructions to cause the substantially transparent electronic display to display an indication of the activation of the corresponding contextual menu option.

25. The NED of claim 24, wherein the controller is further configured to:

determine that a pose of a wearer's hand indicates a pinch-pull gesture with one of the simulated objects representing contextual menu options, the pinch-push gesture formed by a first movement of the wearer's hand to intersect one of the simulated objects, a second movement of the wearer's index finger and thumb such that the distance between the index finger and thumb is below a threshold value, and a third movement of the wearer's hand in a direction towards the wearer's body;

execute instructions corresponding to the contextual menu option associated with a push-pull gesture of the intersected object; and update the display instructions to cause the non-opaque electronic display to display an indication of the activation of a push-pull option of the corresponding contextual menu option.

26. The NED of claim 14, wherein the controller is further configured to:

determine that a gaze of a wearer of the NED terminates at one of the simulated objects;

detect an activation of the secondary touch-sensitive sensor; and execute instructions corresponding to the contextual menu option associated with the one of the simulated objects at which the wearer's gaze terminates.

* * * * *